US011002697B2

United States Patent
Engelbart et al.

(10) Patent No.: US 11,002,697 B2
(45) Date of Patent: May 11, 2021

(54) ROBOTIC INFRARED THERMOGRAPHIC INSPECTION FOR UNITIZED COMPOSITE STRUCTURES

(71) Applicant: The Boeing Company, Chicago, IL (US)

(72) Inventors: Roger W. Engelbart, St. Louis, MO (US); Jeffrey G. Thompson, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

(21) Appl. No.: 16/104,419

(22) Filed: Aug. 17, 2018

(65) Prior Publication Data

US 2020/0057012 A1    Feb. 20, 2020

(51) Int. Cl.
| | | |
|---|---|---|
| G01K 1/08 | (2021.01) | |
| G01N 25/72 | (2006.01) | |
| G01J 5/02 | (2006.01) | |
| G06T 7/00 | (2017.01) | |
| G01J 5/00 | (2006.01) | |

(52) U.S. Cl.
CPC ............... *G01N 25/72* (2013.01); *G01J 5/02* (2013.01); *G06T 7/0004* (2013.01); *G01J 2005/0081* (2013.01); *G06T 2207/10048* (2013.01)

(58) Field of Classification Search
CPC combination set(s) only.
See application file for complete search history.

(56) References Cited

U.S. PATENT DOCUMENTS

| | | |
|---|---|---|
| 3,789,656 A | 2/1974 | Miller |
| 6,786,098 B2 | 9/2004 | Bates |
| 7,287,902 B2 | 10/2007 | Safai et al. |
| 7,553,070 B2 | 6/2009 | Kollgaard et al. |
| 8,418,562 B2 | 4/2013 | Clossen-Von Lanken Schulz et al. |
| 9,519,844 B1 | 12/2016 | Thompson et al. |
| 9,709,443 B2 | 7/2017 | Holmes et al. |
| 9,839,946 B2 * | 12/2017 | Safai .................. G01N 21/8851 |
| 10,094,794 B2 | 10/2018 | Thompson et al. |
| 2014/0172111 A1 * | 6/2014 | Lang .................. B23K 15/0086 623/20.32 |
| 2014/0270473 A1 * | 9/2014 | Youngquist .......... H05K 13/085 382/147 |

(Continued)

OTHER PUBLICATIONS

China Airlines Ltd. Boeing 747-400 Maintenance Manual, Oct. 18, 2003, 177 pages.

(Continued)

*Primary Examiner* — Lisa M Caputo
*Assistant Examiner* — Nasir U. Ahmed
(74) *Attorney, Agent, or Firm* — MH2 Technology Law Group LLP (57) ABSTRACT

A system and method for nondestructive inspection of a unitized composite structures is provided. The system includes an infrared thermographic camera and a carriage that can be mounted on, for example, adjacent frames of the unitized composite structure. The carriage can move along the length of the frames while the infrared thermographic camera collects and analyzes thermographic images of the frame, skin, and stiffeners. The carriage can be moved to other frames and the inspection continued until the entire unitized composite structure has be inspected.

18 Claims, 7 Drawing Sheets

(56) References Cited

U.S. PATENT DOCUMENTS

| | | | |
|---|---|---|---|
| 2015/0048209 A1* | 2/2015 | Hoyt | B33Y 10/00 |
| | | | 244/131 |
| 2017/0052070 A1 | 2/2017 | Marsh et al. | |
| 2017/0112029 A1* | 4/2017 | Shimizu | H05K 13/04 |
| 2017/0148154 A1* | 5/2017 | Nakao | G06T 7/74 |
| 2017/0160183 A1 | 6/2017 | Thompson et al. | |
| 2017/0212066 A1* | 7/2017 | Thompson | H04N 5/2256 |
| 2017/0350764 A1 | 12/2017 | Thompson et al. | |
| 2018/0031491 A1 | 2/2018 | Thompson et al. | |
| 2018/0033136 A1 | 2/2018 | Thompson et al. | |
| 2018/0045574 A1 | 2/2018 | Engelbart et al. | |

OTHER PUBLICATIONS

Jones et al., "An experimental evaluation of crack face energy dissipation," International Journal of Fatigue, 28 (2006) 1716-1724.
Bnp Media, "Active Thermography for Nondestructive Composites Testing," Quality Magazine, Jul. 5, 2013, 5 pages.
Tarin et al., "Fuselage inspection of Boeing-737 using lock-in thermography," Visual Communications and Image Processing, Proc. of SPIE, vol. 6939, 693919 (2008), 10 pages.
Extended European Search Report issued in corresponding European Application No. 19176816.7 dated Jan. 29, 2020, 10 pages.

* cited by examiner

ROBOTIC INFRARED THERMOGRAPHIC INSPECTION FOR UNITIZED COMPOSITE STRUCTURES

FIELD

The present disclosure generally relates to methods and systems for nondestructive inspection of composite structures.

BACKGROUND

A composite structure can be fabricated either as a single unitized composite structure or in multiple parts that must subsequently be assembled. Fabrication of a unitized composite structure, for example an integrally stiffened skin panel, provides several advantages. For example, shorter cycle times and fewer labor requirements reduce manufacturing costs. In addition, manufacturing the unitized composite structure avoids the cost and time associated with use of numerous and varied fasteners.

A unitized composite structure, however, can present inspection challenges. A composite structure needs to be inspected, typically by nondestructive ultrasonic methods. Prior to assembly, ultrasonic transducers have access to all surfaces of the multiple composite parts. With a unitized composite structure, it can be difficult for the transducer to gain access to all surfaces, for example, those near corners. Custom transducers to inspect these areas can be complex and costly. Furthermore, ultrasonic inspection requires the transducer to have access to the exposed surface of the unitized composite structure to transmit and detect ultrasonic waves. Depending on the size and shape of the composite structure, this can be time consuming process.

A cost effective and efficient system and method to nondestructively inspect unitized composite structures would be desirable.

SUMMARY

According to the present teachings, an infrared thermographic inspection system for inspection of a unitized composite structure is provided. The system can include a thermography camera, one or more lights, and a carriage. The carriage can include a carriage body, wherein the thermography camera and the one or more lights are secured to the carriage body. The carriage can further include a first support disposed on the carriage body and a second support disposed on the carriage body, wherein the first support and the second support are spaced apart at a distance for the first support to rest on an edge of a first frame and the second support to rest on an edge of a second frame of the unitized composite structure.

Various optional features of the infrared thermographic inspection system for inspection of a unitized composite structure can include a robot configured to lift and place the carriage on the edge of the first frame and the edge of the second frame of the unitized composite structure. Additional optional features include the first support and the second support each comprising one or more wheels contacting the edge of the first frame and the edge of the second frame, respectively; a motor configured to propel the carriage along a length of the first frame and the second frame; a robot configured to slide the carriage along a length of the first frame and the second frame; a processor configured to provide instructions to the motor; and a mount that extends, retracts and/or swivels to reposition the thermography camera. Additional optional features can further include the carriage being able to position the thermography camera at a distance from the unitized composite structure to permit the thermography camera a field of view of two or more of a plurality of stiffeners disposed between the first and second frames; the first mount and the second mount being shaped to mount the carriage on a straight frame edge, an L shaped frame edge, or a T shaped frame edge; and the processor being configured to provide instructions the thermography camera and synchronizes movement of the carriage with capture of infrared thermography images by the camera.

According to the present teachings, a method for infrared thermographic inspection of a unitized composite structure is provided. The method can include placing an infrared thermographic inspection system on a first frame edge and a second frame edge of the unitized composite structure, wherein the infrared thermographic inspection system comprises a first carriage support and a second carriage support attached to a carriage, the first carriage support and the second carriage support disposed at a distance apart to removably mount on the first frame edge and second frame edge, respectively, and wherein the infrared thermographic inspection system further comprises one or more light sources and a thermography camera. The method further includes directing light from one or more light sources at a first inspection area of the unitized composite structure, capturing a first thermographic image of the first inspection area by the thermography camera mounted on the carriage, and moving the carriage in a direction lengthwise relative to the first frame edge and the second frame edge. Light from one or more light sources can be directed at a second inspection area and a second thermographic image of the second inspection area can be captured by the thermography camera mounted on the carriage.

Various optional features of the method for infrared thermographic inspection of a unitized composite structure can include placing the carriage on the first frame edge and the second frame edge by a robot; and moving the carriage lengthwise along the first frame edge and the second frame edge by a robot. Other optional features can include moving the carriage lengthwise along the first frame edge and the second frame edge by rolling the carriage; engaging a motor to roll the carriage; adjusting a field of view of the infrared camera to include at least two or more stiffeners, wherein the at least two or more stiffeners are part of a plurality of stiffeners disposed in a row between two frames of the unitized composite structure; moving the carriage in a lengthwise direction along the first frame edge and the second frame edge to capture additional thermographic images to inspect an entire row of stiffeners between the first frame and the second frame; and placing the carriage on a third frame edge and a fourth frame edge of the unitized composite structure to inspect stiffeners disposed between the third frame and the fourth frame. Additional optional features can include using a robot to place the carriage on a third frame edge and a fourth frame edge; and using a secondary heat source to locally heat corners of the unitized composite structure.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate the present disclosure and together with the description, serve to explain the principles of the present disclosure.

FIG. 1A depicts a perspective view of an exemplary unitized composite structure according to the present disclosure;

FIG. 1B depicts a side view of an exemplary unitized composite structure according to the present disclosure;

DESCRIPTION

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure may be practiced. These implementations are described in sufficient detail to enable those skilled in the art to practice the present disclosure and it is to be understood that other implementations may be utilized and that changes may be made without departing from the scope of the present disclosure. The following description is, therefore, merely exemplary.

Implementations of the present disclosure address the need for a cost effective and efficient system and method to nondestructively inspect unitized composite structures. The disclosed infrared thermographic inspection system can be mounted on top of two frames and move in a lengthwise direction to inspect the frame, skin, and an entire row of stiffeners between the two frames. It can then be mounted on another two frames of the unitized composite structure. In this manner, inspection of the entire unitized composite structure can be completed. The disclosed infrared thermographic inspection system reduces inspection times and provides inspection of all surfaces without the need for customized ultrasonic transducers. Moreover, the disclosed method can be advantageously automated so that it can move along the top of a pair of frames in a lengthwise direction and move to another pair of frame with little or no need of assistance from a technician. While the examples below disclose systems and methods for infrared thermography in the context of a unitized composite aerospace structure, one of ordinary skill in the art will understand that the exemplary systems and methods can be used on any unitized composite structure. Examples include, but are not limited to, composite boat hulls and cylindrical vessels.

Figures 1A, 1B:
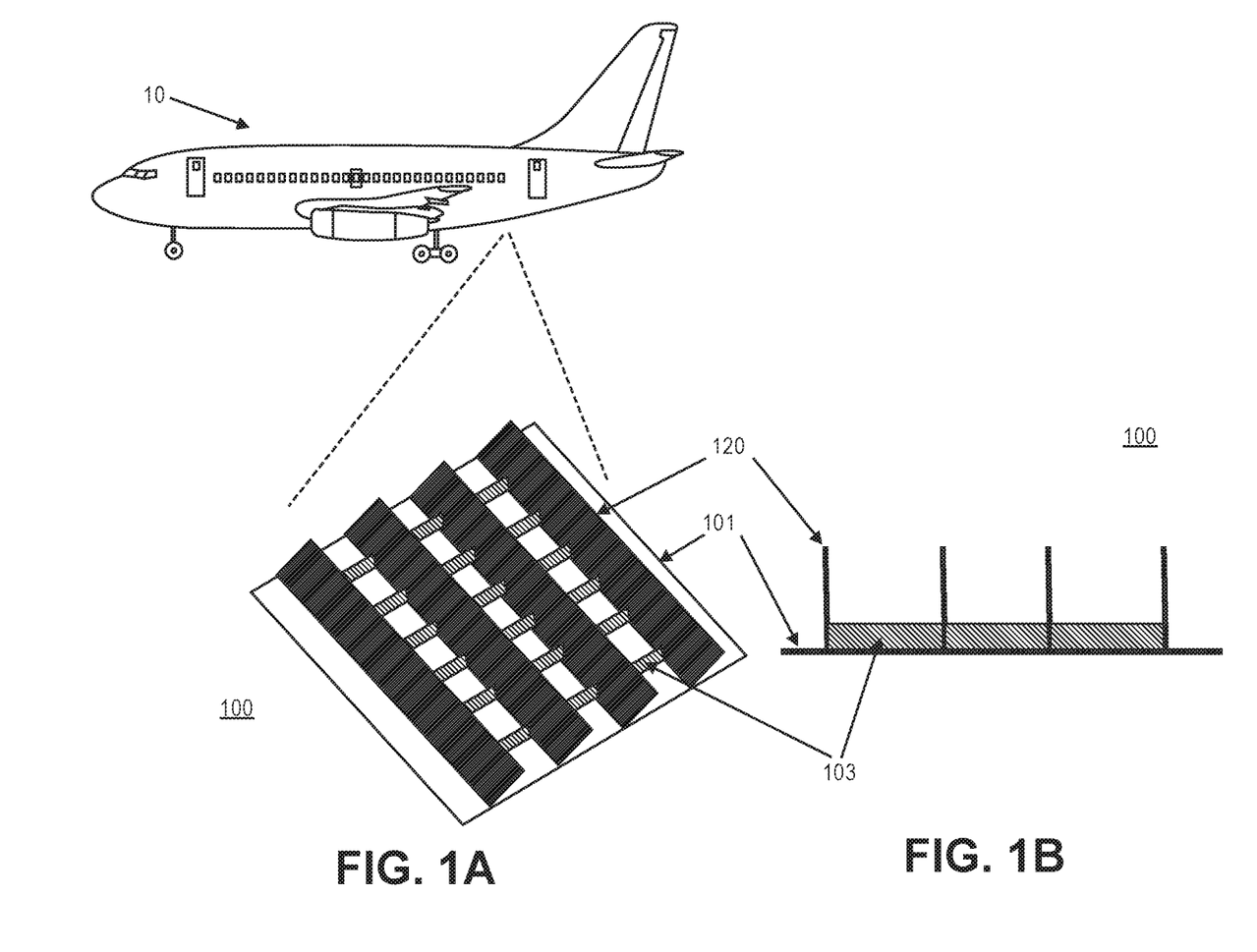

FIG. 1A shows a perspective view of an exemplary unitized composite structure 100. For example, unitized composite structure 100 can form a portion of aircraft 10. Composite structure can range in size, for example, from 10 ft.×15 ft. to 40 ft.×60 ft. or larger. FIG. 1B shows a side view of unitized composite structure 100. Unitized composite structure 100 includes a skin 101 and a plurality of frames 120 oriented generally perpendicular to skin 101. A plurality of stiffeners 103 (also referred to as "continuous stiffeners" or "stringers") are disposed in rows between adjacent frames 120. Although plurality of stiffeners 103 are depicted with a blade or inverted "T" configuration, one of ordinary skill in the art will understand that implementations of the present teachings encompass other configurations. They include, but are not limited to, open shapes such as an "I" or inverted "J" or closed shapes such as a "hat shaped," trapezoidal, rounded hat or rectangular cross sections. During manufacturing, fabric performs of skin 101, frames 120, and stiffeners 103 are stitched together to make a single preform that is then infused with resin and cured. Alternatively, the frames 120, skin 101, and stiffeners 103 can be individually made with pre-impregnated carbon or other fibers and assembled prior to cure to form the unitized composite structure. After curing, all surfaces of unitized composite structure 100 must be inspected. As is evident, inspection of corners, for example the inside or interior corners, formed by a frame and a stiffener or corners formed by a frame and the skin are difficult to inspect ultrasonically. Ultrasonic inspection can also be time consuming due to the size of unitized composite structure 100.

Figure 2:
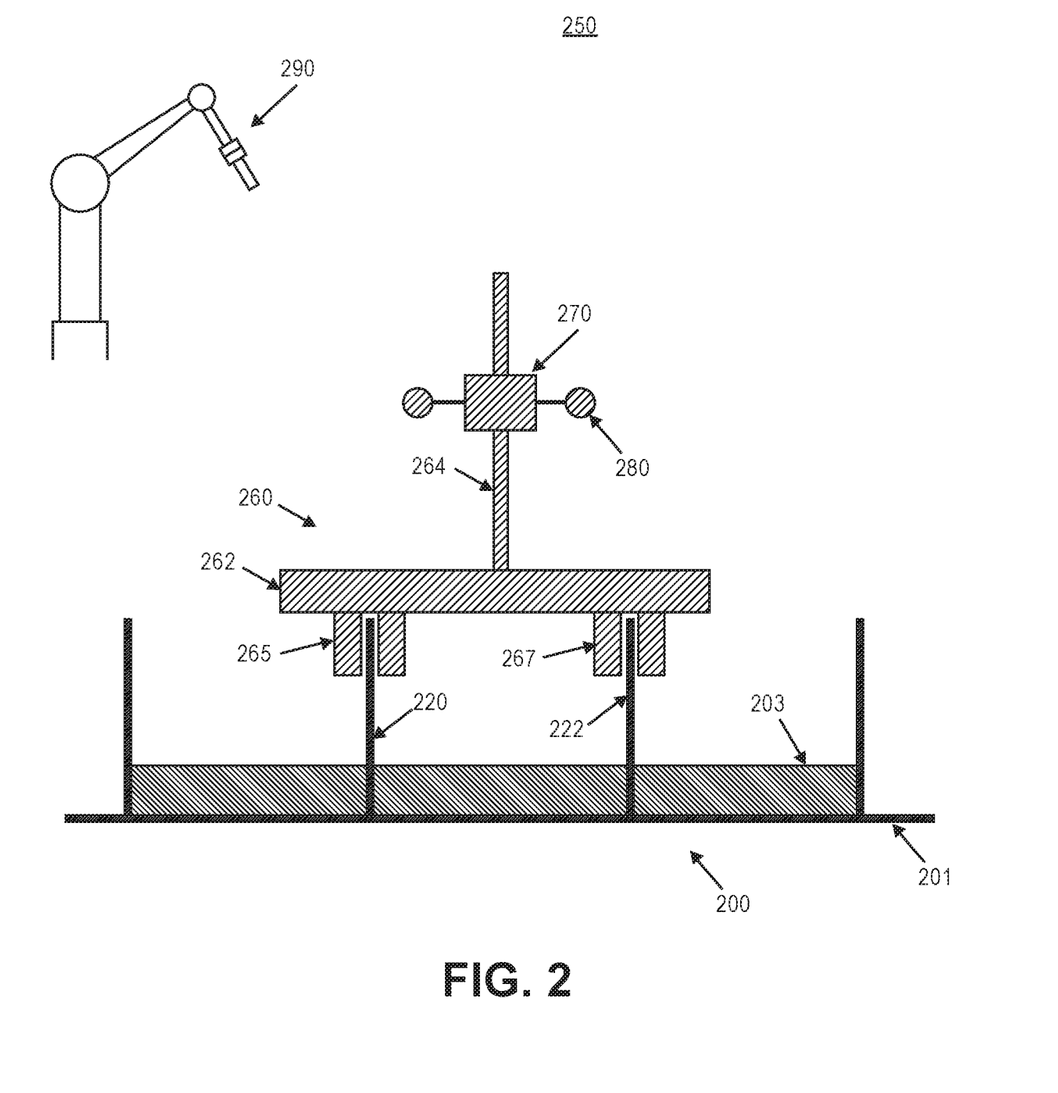
FIG. 2 depicts an exemplary infrared thermographic inspection system according to the present disclosure.

FIG. 2 shows an exemplary infrared thermographic inspection system 250. Infrared thermographic inspection system 250 includes a carriage 260, a thermography camera 270 (also referred to herein as an "infrared thermography camera'), and one or more lights 280. Examples of thermography camera 270 include, but are not limited to, FLIR X8000sc series (FLIR Systems, Wilsonville, Oreg.) and Indigo Merlin Mid (Indigo Systems, Goleta, Calif.). Thermography camera 270 can also include software and hardware to capture, store, manipulate, and or display thermographic images taken during inspection. Examples of lights 280 that provide heat include, but are not limited to, Xenon flash tubes, quartz flash lamps, and photographic flash lamps. In implementations, infrared thermographic inspection system 250 can include a processor (not shown) to control movement of one or all of carriage 260, camera 270, and lights 280. The processor can also store, manipulate and display thermographic images captured during inspection. The processor can be part of a computer connected to the infrared thermographic inspection system or incorporated into the infrared thermography camera.

Carriage 260 can include, for example, a carriage body 262, a mount 264 for thermography camera 270 and/or lights 280, first support 265 and second support 267. Carriage body 262 can be any shape or configuration from which first support 265 and second support 267 can extend. Carriage body 262 also securely supports mount 264, thermography camera 270, and/or lights 280. Mount 264 serves to attach thermography camera 270 to carriage body 262 and can be, for example, a pole, a gimbal, turntable or a screw. It can be sized to mount thermography camera 270 a sufficient distance from the unitized composite structure to be inspected. In other words, mount 264 can be any shape or size that secures thermography camera 270 to carriage body 262 and provides a desired field of view for thermography camera 270 to inspect the unitized composite structure. For example, a gimbal can attach thermography camera 270 to carriage body 262 and allow thermography camera 270 to move in a vertical direction closer or further away from the unitized composite structure and rotate to further change the field of view of thermography camera 270.

First support 265 and second support 267 serve to support and stabilize infrared thermographic inspection system 250 as it sits on the frames of the unitized composite structure being inspected. First support 265 and second support 267 can be aluminum, or composite, for example, fiberglass/epoxy or carbon/epoxy. The supports can vary in size and shape depending on a number of factors including, but not limited to, with width of the frame edges, the distance between frames, and the size and weight of the thermography camera and lights. Although shown extending out from carriage body 262, first support 265 and second support 267 can be, for example, grooves in carriage body 262 spaced apart to match the distance between frames. For reference purposes, FIG. 2 also shows a unitized composite structure 200 including a skin 201, a plurality of stiffeners 203, a first frame 220, and a second frame 222. As shown, infrared thermographic inspection system 250 rests on a top of first frame 220 and a top of a second frame 222. Although depicted resting on adjacent frames 220 and 222, one of ordinary skill in the art will understand that infrared thermographic inspection system 250 can rest on non-adjacent frames, if desired. First support 265 and second support 267 can also include low friction features that facilitate sliding of first support 265 and second support 267 along tops of first frame 220 and the second frame 222. The low friction features can include, but are not limited to, coatings deposited on the first and second supports, pieces of low friction materials attached to first and second supports, and air bearings.

Figure 3A:
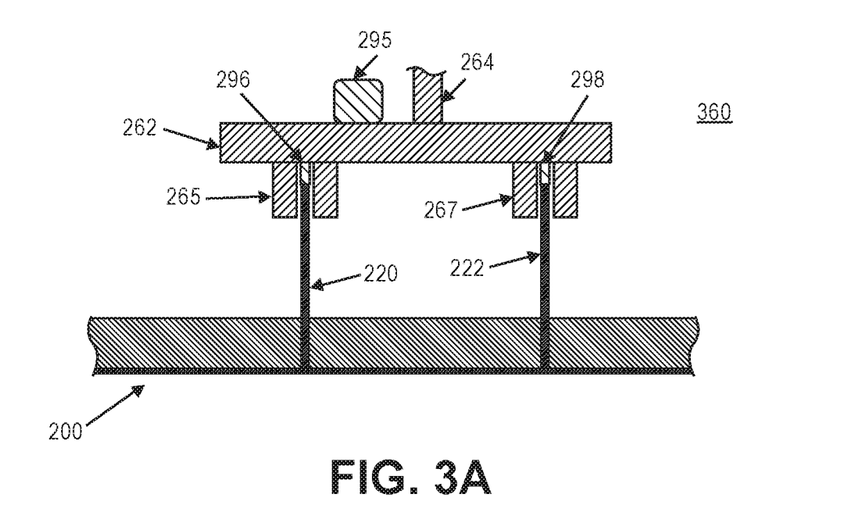
FIGS. 3A-C depict other exemplary infrared thermographic inspection systems according to the present disclosure.

The infrared thermographic inspection system can further include one or more wheels, also referred to herein as "rollers." As shown in FIG. 3A, a first wheel 296 and a second wheel 298 can be mounted to allow carriage body 262 to roll along a top of first and second frames 220 and 222 in a direction along a length of the frames. Partial views of unitized composite structure 200 and carriage 360 are also shown. For example, first wheel 296 and second wheel 298 can be secured to carriage body 262, first and second supports 265 and 267, or to any other location to allow carriage 360 to roll along the top of two frames. Wheels can be mounted in pairs and more than one pair can be used to provide stability to carriage 360 as it rolls. In various implementations, wheels can be made of a soft rubber to avoid damaging the frames.

Figure 3B:
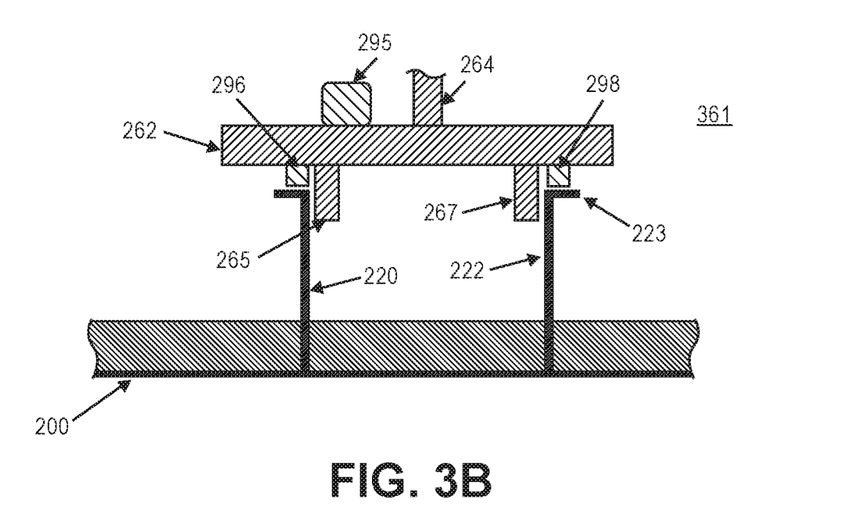
Figure 3C:
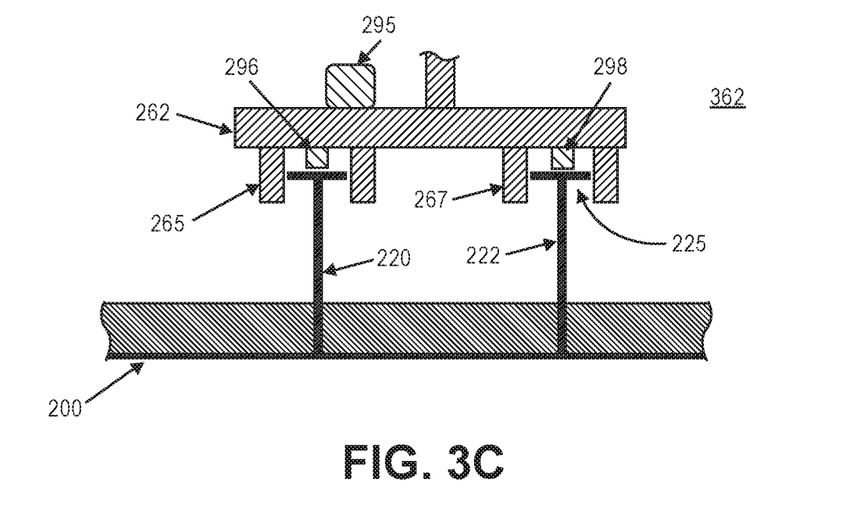

Although FIGS. 2 and 3A show frames with straight edges, infrared thermographic inspection system 250 can be used to inspect unitized composite structures with other frame edge shapes. As used herein, "frame edge" refers to an end of the frame opposite an end of the frame adjacent to the skin. For, example, FIG. 3B, shows first and second frames 220 and 222 with an L-shaped frame edge 223. Partial views of unitized composite structure 200 and carriage 361 are also shown. FIG. 3C, shows first and second frames 220 and 222 with a T-shaped frame edge 225. Partial views of unitized composite structure 200 and carriage 362 are also shown. One of ordinary skill in the art understands that the disclosed infrared thermographic inspection systems can be used to inspect unitized composite structures with other frame edge shapes and that the shape, size, and number of supports can vary in order to securely mount the infrared inspection system on other frame edges.

In an implementation, the infrared thermographic inspection system can further include a robot. Referring to infrared thermographic inspection system 250 shown in FIG. 2, robot 290 can move carriage 260, attached infrared thermography camera 270, and lights 280 to another location along a length of first and second frames 220 and 220 to inspect other stiffeners in a same row of stiffeners. For example, after capturing a thermographic image of two or more stiffeners, robot 290 can mount infrared thermographic inspection system 250 at a different location on the frames by picking up or sliding infrared thermographic inspection system 250 lengthwise along the top of the frames. Robot 290 can also mount carriage 260, infrared thermography camera 270, and lights 280 on a different set of frames, for example, adjacent to first and second frames 220 and 222 to inspect another row of stiffeners.

Referring to FIGS. 3A-C, robot 290 can be used to roll carriage 360, 361, or 362 and their associated infrared thermography cameras and lights to another location along the length of first and second frames 220 and 222 to inspect other stiffeners in a same row of stiffeners. Robot 290 can also be used to pick up carriage 360, 361, or 362, and their associated infrared thermography cameras and lights, and mount the carriage on another pair of frames.

In another implementation, infrared thermographic inspection system 250 can include a motor. A motor 295 shown in FIGS. 3A-C can be used in conjunction with first and second wheels 296 and 298 to roll carriage 360, 361, or 362 and their associated infrared thermography cameras and lights along the top of first frame 220 and second frame 222. Motor 295 can be, for example, a small stepper motor typically used for equipment positioning, such as Electro-Craft TorquePower motors (ElectroCraft, Inc., Gallipolis, Ohio).

Infrared thermographic inspection system 250 can also include a processor that provides instruction to motor 295. Instructions can include, for example, when to move carriage 360, 361, or 362 to a new location along the top of a pair of frames and how far to move the carriage. For example, the processor can provide instructions to the motor and to the camera for image capture and analysis. The processor can be incorporated into a system that includes a software package for data acquisition and analysis, and archives and displays the images in sequence to show coverage of a complete area. Control of the robot and platform motion would be integrated with and slaved to the camera for image capture and analysis in order to retain that sequential acquisition and display of images. For example, the processor can provide instructions to continuously move the carriage while the thermography camera inspects and collects images. Alternatively, the processor can provide instructions to move the carriage to a fixed location so the thermography camera can inspect and collect images before the processor provides instructions to move the carriage to another fixed location to be inspected.

Figure 4:
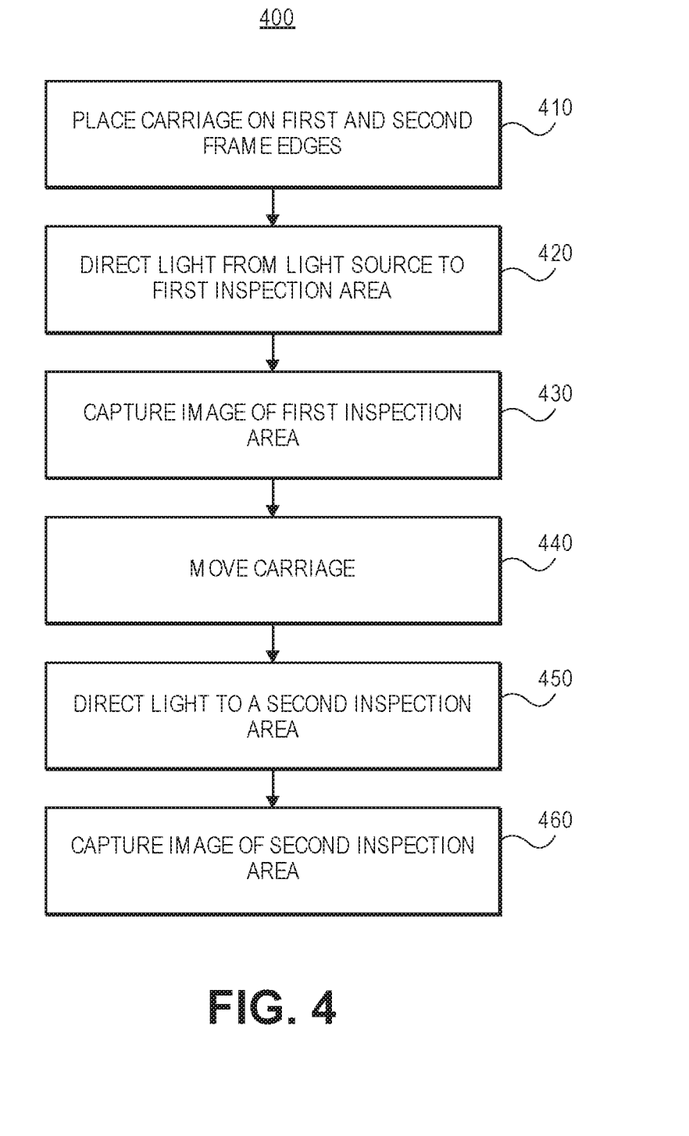
FIG. 4 is a flowchart of a method for infrared thermographic inspection of a unitized composite structure according to the present disclosure.

FIG. 4 shows an exemplary method 400 for infrared thermographic inspection of a unitized composite structure. Although the exemplary method is described with respect to inspection of a unitized composite structure during fabrication of, for example, a vehicle, one of ordinary skill in the art will understand that the disclosed method can be used for in-service inspection.

At 410, an infrared thermographic inspection system is mounted on a first frame edge and a second frame edge of a unitized composite structure. The unitized composite structure can include, for example, skin, frames, and stiffeners as shown in FIGS. 1A-B and 2. Referring to FIG. 2, an exemplary infrared thermographic inspection system 250 can include a carriage 260 including a thermography camera 270, and one or more lights 280. Carriage 260 can include, for example, carriage body 262, mount 264 for thermography camera 270 and/or lights 280, and first support 265 and second support 267. First support 265 and second support 267 can be attached to carriage body 262 at a distance apart that matches the distance between a first frame 220 and a second frame 222. In an implementation, the distance between first support 265 and second support 267 can be adjustable. Thus, infrared thermographic inspection system 250 can be placed on an edge of first frame 220 and an edge of second frame 220 of unitized composite structure 200 such that first support 265 is removably mounted on top of first frame 220 and second support 267 is removably mounted on top of second frame edge 222.

At 420, light from one or more light sources can be directed at a first inspection area of the unitized composite body. For example, a first inspection area 571 is represented by the enclosed area in FIG. 5 and can include two or more stiffeners. In this example, first inspection area 571 includes stiffeners 503a, 503b, and 503c from the row of stiffeners 503, portions of the inside surface of frames 520 and 522, and portions of skin 501. One of ordinary skill in art understands that the depicted inspection area can be larger or smaller and include or exclude other features of unitized composite structure 500. In an embodiment where the unitized composite structure includes tight corners where light and the subsequent heat pulse at the surface would be inadequate, localized application of heat from a secondary heat source such as a heat gun, can be used. The secondary heat source can be retractably mounted on carriage 260 and operated manually by an inspector. The secondary heat source can also be mounted on carriage 260 using a mechanism that automatically extends and retracts the heat gun.

At 430, a first thermographic image of the first inspection area can be captured with an infrared camera mounted on the carriage. For example, referring again to FIG. 5, infrared thermography camera 570 can be positioned by the carriage and its mount at a distance and/or angle from unitized composite structure 500 to provide field of view that encompasses a first inspection area 571. In particular, first inspection area 571 can include stiffeners 503a, 503b and 503c, portions of the inside surface of frame 520 and 522 located near the stiffeners, and portions of skin 501. Corners formed by the frame and stiffeners, and corners formed by the frame/stiffeners and skin are also included in first inspection area 571. The field of view, however, can be larger or smaller and include more or less of the unitized composite structure as desired.

At 440, the carriage is moved. Referring to FIG. 2, carriage 260 can be moved in a direction lengthwise along frames 220 and 222 (into or out of the page as depicted in FIG. 2). Movement of carriage 260 can be continuous or intermittent. Mount 264, camera 270, and one or more lights 280, attached to carriage 260, are also moved with carriage 260. Carriage 260 can be moved, for example, by robot 290. Robot 290 can lift and place the carriage or slide the carriage along the top the two frames in a lengthwise direction. In implementations where the carriage includes wheels or rollers, it can be moved by rolling it along the top of two frames by robot 290 or using a motor. As shown in FIGS. 3A-C, carriages 360, 361, and 362 can be moved by engaging motor 295 to drive wheels 296 and 298 to roll on the top of frames 220 and 222 in a lengthwise direction. Control of the motor and wheels can be manual or use a computer and/or processor.

Figure 5:
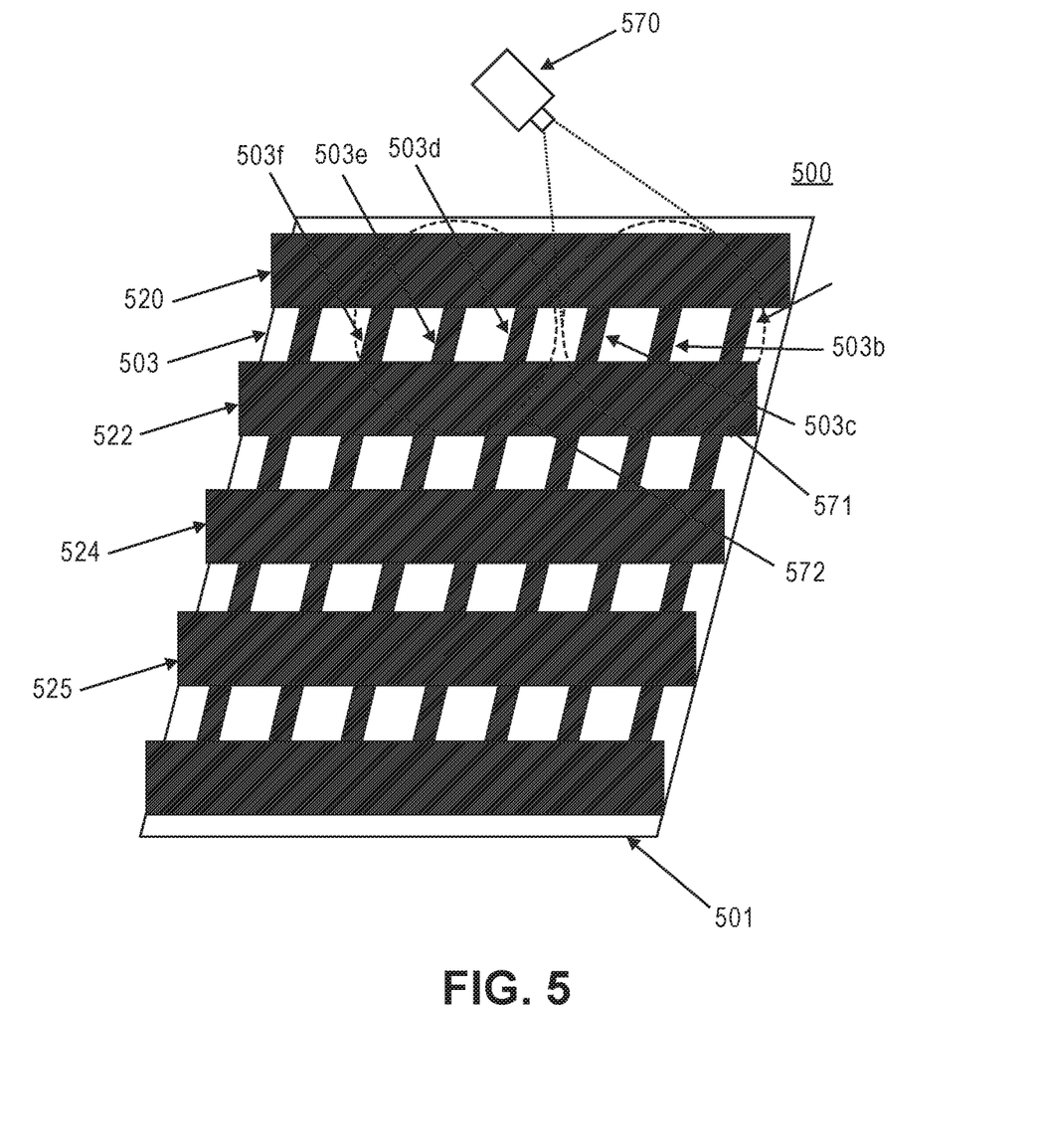
FIG. 5 depicts a method for infrared thermographic inspection of a unitized composite structure according to the present disclosure.

At 450, light from the one or more light sources is directed at a second inspection area. As shown in FIG. 5, after the carriage is moved lengthwise along frames 520 and 522, a second inspection area 572 will be in the field of view of camera 570. Second inspection area 572 is represented by the enclosed area in FIG. 5. In this example, second inspection area 572 includes stiffeners 503d, 503e, and 503f from the row of stiffeners 503, portions of frames 520 and 522 adjacent to the stiffeners, and portions of the skin. Corners formed by the frame and stiffeners, and corners formed by the frame/stiffeners and skin are also included in second inspection area 572. Field of view of second inspection area 572 can also be adjusted by moving the camera and/or changing the focal point of the thermography camera lens.

In implementations, light from the one or more light sources can be continuous, pulsed, or flashed. When using light that is flashed, movement of the carriage, the flashed lighting and image capture by the infrared thermography camera can be synchronized.

At 460, a thermographic image of the second inspection area can be captured with the infrared camera mounted on the carriage. Referring to FIG. 5, moving the carriage can allow infrared thermography camera 570 to capture a second thermographic image represented by field of view 572.

Once the carriage has been moved along length of the pair of frames and infrared thermographic images of the entire row of stiffeners captured, it can then be moved to another pair of frames to inspect another row of stiffeners. Moving the carriage to another pair of frames can be accomplished, for example, using robot 290 or manually by a technician. Referring to FIG. 5, once inspection of stiffeners between a first frames 520 and second 522 has been completed, the carriage, camera, and lights can be moved to rest on top of second frame 522 and third 524 to inspect the stiffeners disposed between second frame 522 and third frame 524. This process can be repeated on third frame 524 and fourth frame 525 and so on until inspection of the unitized composite structure is completed.

Figure 6:
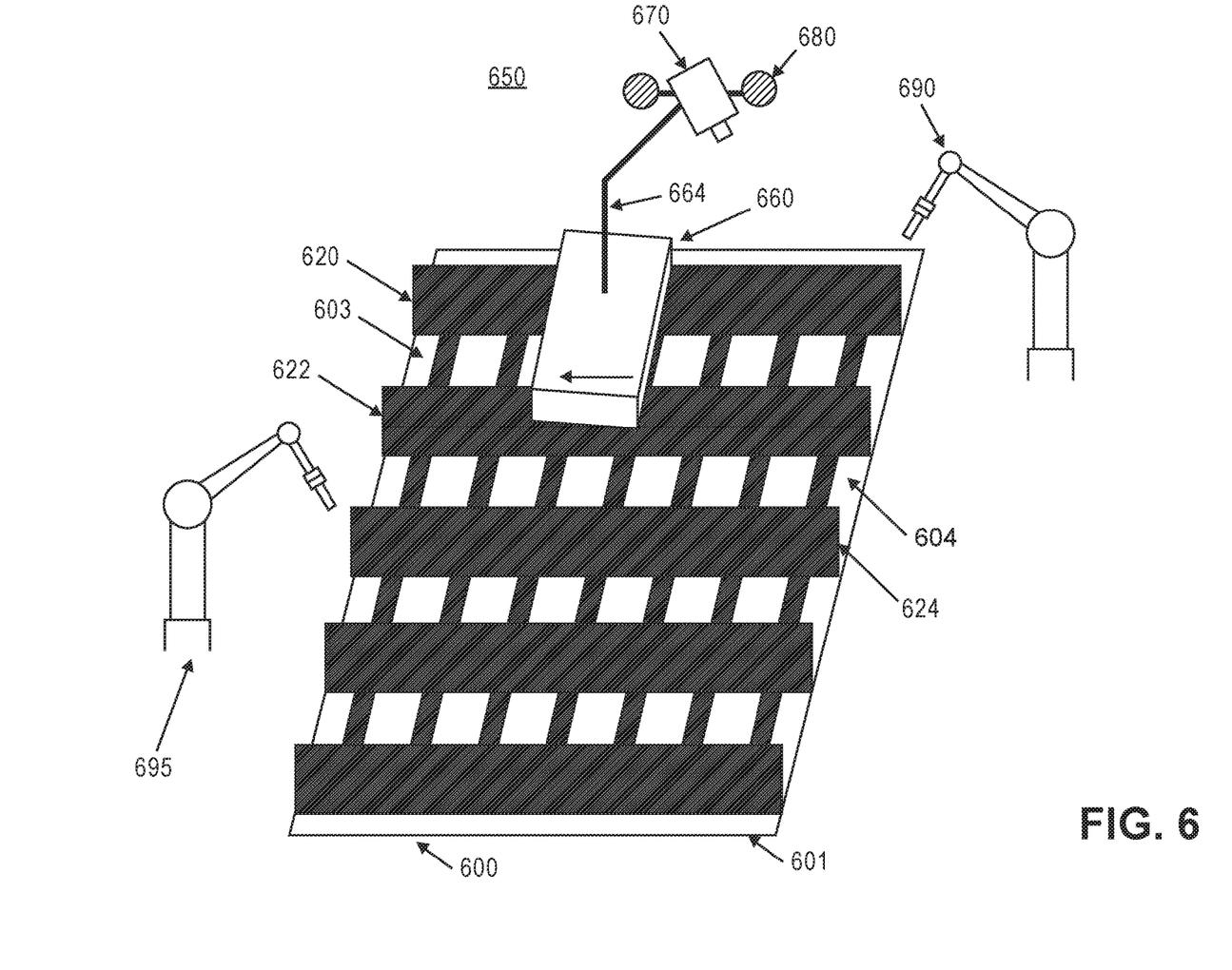
FIG. 6 depicts a perspective view of another exemplary infrared thermographic inspection system and method according to the present disclosure.

Some or all of the disclosed method can be advantageously automated. As shown in FIG. 6, an exemplary infrared thermography inspection system 650 can include carriage 660, thermography camera 670, lights 680, and a first robot 690. For example, first robot 690 can mount infrared thermography inspection system 650 on top of a first frame 620 and a second frame 622 of unitized composite structure 600. Carriage 660 can include a motor and wheels to move carriage 660 along the top of first frame 620 and second frame 622. For example, after a thermographic image is captured of a first field of view, the motor can direct rolling of carriage 660, thermography camera 670, and lights 680 along the top of frames 620 and 622 to provide thermography camera 670 a second field of view. This can continue until completion of the inspection of the inside of frames 620 and 622, skin 601, and row of stiffeners 603. First robot 690 can then move infrared thermography inspection system 650 to rest on top of another pair of frames 622 and 624. This can be accomplished by robot 690 moving to retrieve infrared thermography inspection system 650 or by infrared thermography inspection system 650 moving back across the top of frames 620 and 622 to robot 690.

In another implementation, infrared thermography inspection system 650 can include additional robots, for example, a second robot 695 to move infrared thermography inspection system 650 to rest on top of frames 622 and 624. For example, first robot 690 can mount infrared thermography inspection system 650 on frames 620 and 622. After infrared thermography inspection system 650 completes inspection of row of stiffeners 603, moving from right to left as depicted by the arrow, second robot 695 can move infrared thermography inspection system 650 to rest on frames 622 and 624. Infrared thermography inspection system 650 can then continue inspection by moving from left to right as depicted in FIG. 6. Upon completion of the inspection of the stiffeners between frames 622 and 624, first robot 690 can move infrared thermography inspection system 650 to another pair of frames and inspection can continue, in a direction back towards second robot 695. Inspection can continue in this manner until unitized composite structure 600 is completely inspected. Exemplary infrared thermography inspection system including more than one robot minimizes travel distance of the robots and reduces inspection time.

In implementations where a width of unitized composite structure 600 is larger than the reach of robots 690 and 695, a plurality of robots can installed on the sides of unitized composite structure 600 so that infrared thermography inspection system 650 can be moved to inspect the entirety of unitized composite structure 600.

In other implementations, the mount for the infrared thermography camera can swivel and/or extend. Referring to FIG. 6, mount 664 can be articulated to allow it to extend and retract. Mount 664 can also swivel to position camera to inspect a row of stiffeners adjacent to the row of stiffeners over which carriage 660 rests. For example, infrared thermography inspection system 650 can move on frames 620 and 622 to inspect row of stiffeners 603, as well as the skin and frames 620 and 622. When completed, mount 664 can extend and swivel to position thermography camera 670 to inspect an adjacent row of stiffeners, for example row of stiffeners 604, as well as the skin and frames associated with row of stiffeners 604.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. For example, steps of the methods have been described as first, second, third, etc. As used herein, these terms refer only to relative order with respect to each other, e.g., first occurs before second. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. An infrared thermographic inspection system for inspection of a unitized composite structure comprising:
   a thermography camera; one or more lights; and, a carriage comprising,
   a carriage body, wherein the thermography camera and the one or more lights are secured to the carriage body,
   a first support disposed on the carriage body, and
   a second support disposed on the carriage body, wherein the first support and the second support are adjustably spaced apart at a distance that restricts the carriage body from movement in a direction normal to for the first support to rest on an edge of a first frame and the second support to rest on an edge of a second frame of the unitized composite structure and permits the carriage body to move in a direction along the first frame and the second frame of the unitized composite structure; and
   a robot configured to lift and place the carriage on an edge of the first frame and an edge of the second frame of the unitized composite structure.

2. The infrared thermographic inspection system of claim 1, wherein the first support and the second support each comprise one or more wheels contacting an edge of the first frame and an edge of the second frame, respectively.

3. The infrared thermographic inspection system of claim 2, wherein the carriage further comprising a motor configured to propel the carriage along a length of the first frame and the second frame.

4. The infrared thermographic inspection system of claim 1, wherein the robot is configured to slide the carriage along a length of the first frame and the second frame or to lift and place the carriage along the length of the first frame and the second frame.

5. The infrared thermographic inspection system of claim 3, further comprising a processor configured to provide instructions to the motor.

6. The infrared thermographic inspection system of claim 3, further comprising a processor configured to provide instructions to the motor and the thermography camera that synchronizes movement of the carriage with capture of infrared thermography images by the thermography camera.

7. The infrared thermographic inspection system of claim 1, further comprising a mount that extends, retracts, and/or swivels to reposition the thermography camera.

8. The infrared thermographic inspection system of claim 1, wherein the carriage positions the thermography camera at a distance from the unitized composite structure to permit the thermography camera a field of view of two or more of a plurality of stiffeners disposed between the first and second frames.

9. The infrared thermographic inspection system of claim 1, wherein the first support and the second support are shaped to mount the carriage on a straight frame edge, an L shaped frame edge, or a T shaped frame edge.

10. A method for infrared thermographic inspection of a unitized composite structure comprising:
   placing an infrared thermographic inspection system on a first frame edge and a second frame edge of the unitized composite structure,
   wherein the infrared thermographic inspection system comprises a first carriage support and a second carriage support attached to a carriage, the first carriage support and the second carriage support adjustably disposed at a distance apart to restrict the carriage from movement in a direction normal to mount on the first frame edge and second frame edge and permit the carriage to move in a direction normal to the first frame and the second frame, and wherein the infrared thermographic inspection system further comprises one or more light sources and a thermography camera;
   wherein placing the carriage on the first frame edge and the second frame edge comprises a robot placing the carriage on the first frame edge and the second frame edge,
   directing light from one or more light sources at a first inspection area of the unitized composite structure;
   capturing a first thermographic image of the first inspection area by the thermography camera mounted on the carriage;
   moving the carriage in a lengthwise direction relative to the first frame edge and the second frame edge;
   directing light from one or more light sources at an second inspection area; and capturing a second thermographic image of the second inspection area by the thermography camera mounted on the carriage.

11. The method for infrared thermographic inspection of claim 10, wherein moving the carriage lengthwise along the first frame edge and the second frame edge comprises a robot moving the carriage lengthwise along the first frame edge and the second frame edge.

12. The method for infrared thermographic inspection of claim 10, wherein moving the carriage lengthwise along the first frame edge and the second frame edge comprises rolling the carriage.

13. The method for infrared thermographic inspection of claim 12, wherein rolling the carriage comprises engaging a motor to roll the carriage.

14. The method for infrared thermographic inspection of claim 10, further comprising, prior to capturing a first thermographic image, adjusting a field of view of the thermography camera to include at least two or more stiffeners, wherein the at least two or more stiffeners are part of a plurality of stiffeners disposed in a row between two frames of the unitized composite structure.

15. The method for infrared thermographic inspection of claim 10, further comprising moving the carriage in a lengthwise direction along the first frame edge and the second frame edge to capture additional thermographic images to inspect an entire row of stiffeners between the first frame and the second frame.

16. The method for infrared thermographic inspection of claim 10, further comprising placing the carriage on a third frame edge and a fourth frame edge of the unitized composite structure to inspect stiffeners disposed between the third frame and the fourth frame.

17. The method for infrared thermographic inspection of claim 16, wherein placing the carriage on a third frame edge and a fourth frame edge comprises a robot placing the carriage on the third frame edge and the fourth frame edge.

18. The method for infrared thermographic inspection of claim 10, further comprising using a secondary heat source to locally heat corners of the unitized composite structure.

\* \* \* \* \*